US012647776B2

(12) United States Patent
Todasco et al.

(10) Patent No.: US 12,647,776 B2
(45) Date of Patent: *Jun. 2, 2026

(54) ON-DEVICE DATA PRIVACY OPERATIONS TO PREVENT DATA SHARING AT USER LOCATIONS

(71) Applicant: PAYPAL, INC., San Jose, CA (US)

(72) Inventors: Michael Charles Todasco, Santa Clara, CA (US); Clare Patrice Tandy, Portola Valley, CA (US); Cynthia O'Yang, Los Altos, CA (US)

(73) Assignee: PAYPAL, INC., San Jose, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 18/772,989

(22) Filed: Jul. 15, 2024

(65) Prior Publication Data

US 2025/0056213 A1 Feb. 13, 2025

Related U.S. Application Data

(63) Continuation of application No. 17/683,192, filed on Feb. 28, 2022, now Pat. No. 12,075,235.

(51) Int. Cl.
H04W 12/02 (2009.01)
G06F 21/62 (2013.01)
H04W 12/63 (2021.01)

(52) U.S. Cl.
CPC ........ H04W 12/02 (2013.01); G06F 21/6245 (2013.01); H04W 12/63 (2021.01)

(58) Field of Classification Search
CPC .... H04W 12/02; H04W 12/63; G06F 21/6245
See application file for complete search history.

(56) References Cited

U.S. PATENT DOCUMENTS

| | | | |
|---|---|---|---|
| 8,135,624 B1 | 3/2012 | Ramalingam et al. | |
| 9,792,432 B2 * | 10/2017 | Bilogrevic .............. | G06F 21/54 |

(Continued)

OTHER PUBLICATIONS

International Preliminary Report on Patentability for Application No. PCT/US2023/013688, mailed on Sep. 12, 2024, 9 pages.

(Continued)

*Primary Examiner* — Viral S Lakhia
(74) *Attorney, Agent, or Firm* — Haynes and Boone, LLP

(57) ABSTRACT

There are provided systems and methods for on-device data privacy operations to prevent data sharing at user locations. A service provider, such as a merchant location of a merchant and/or associated online transaction processor, may provide additional services for to users via user data that may be tracked or stored of the user. However, the user may not want to share certain data with the merchant or other backend processor for privacy concerns. Thus, on-device data privacy operations may be used to detect when a user is at a location that has a corresponding privacy setting to hide or abstract user data for the location. The privacy setting may designate data to prevent from sharing when the user uses their device with devices associated with the location. Abstracted data associated with recommendations or actions to provide the user may be generated and provided to a merchant for the location.

17 Claims, 6 Drawing Sheets

(56) References Cited

U.S. PATENT DOCUMENTS

| | | | |
|---|---|---|---|
| 10,002,248 B2 * | 6/2018 | Jones-McFadden | ......................... G06F 21/564 |
| 10,038,678 B2 * | 7/2018 | Kravitz | ................... H04L 67/10 |
| 10,332,108 B2 | 6/2019 | Ciurea | |
| 10,637,853 B2 * | 4/2020 | Lindemann | ........... H04L 63/061 |
| 10,754,984 B2 * | 8/2020 | Hailpern | ............. G06F 21/6263 |
| 10,798,066 B2 | 10/2020 | Chizi et al. | |
| 10,817,618 B2 | 10/2020 | Garg et al. | |
| 10,887,308 B1 | 1/2021 | Spiegel | |
| 11,144,923 B1 | 10/2021 | Griffith et al. | |
| 11,350,270 B2 * | 5/2022 | James | ................... H04W 12/02 |
| 11,494,777 B2 | 11/2022 | Bharghavan et al. | |
| 11,515,997 B2 * | 11/2022 | Duchin | ................... H04L 9/008 |
| 11,636,489 B2 | 4/2023 | Bharghavan et al. | |
| 12,326,961 B2 * | 6/2025 | Langley | ................. H04L 63/10 |
| 12,417,191 B2 * | 9/2025 | Gonabal | .............. H04L 9/3247 |
| 2011/0238514 A1 | 9/2011 | Ramalingam et al. | |
| 2013/0268357 A1 | 10/2013 | Heath | |
| 2013/0275305 A1 | 10/2013 | Duplan | |
| 2015/0006390 A1 | 1/2015 | Aissi et al. | |
| 2018/0322487 A1 | 11/2018 | Shenker et al. | |
| 2021/0192066 A1 | 6/2021 | Naqvi et al. | |
| 2021/0390190 A1 | 12/2021 | Walker et al. | |
| 2022/0058651 A1 | 2/2022 | Mttimberga | |
| 2022/0269823 A1 | 8/2022 | Iyer et al. | |
| 2022/0300653 A1 * | 9/2022 | Wrenn | ................ G06F 21/6272 |

OTHER PUBLICATIONS

NIST Big Data Public Working Group Definitions and Taxonomies Subgroup: "NIST Big Data Interoperability Framework: vol. 2, Big Data Taxonomies NIST SP 1500-2", NIST, National Institute of Standards and Technology (NIST), Oct. 21, 2015, 31 pages, Retrieved from the Internet: URL: https://nvlpubs.nist.gov/nistpubs/SpecialPublications/NIST.SP 1500-2.pdf [retrieved on Oct. 31, 2015].

Extended European Search Report Application No. EP23760633.0, Nov. 17, 2025, 10 pages.

International Search Report and Written Opinion for Application No. PCT/US2023/013688 mailed on Jun. 8, 2023, 10 pages.

* cited by examiner

Figure 2:
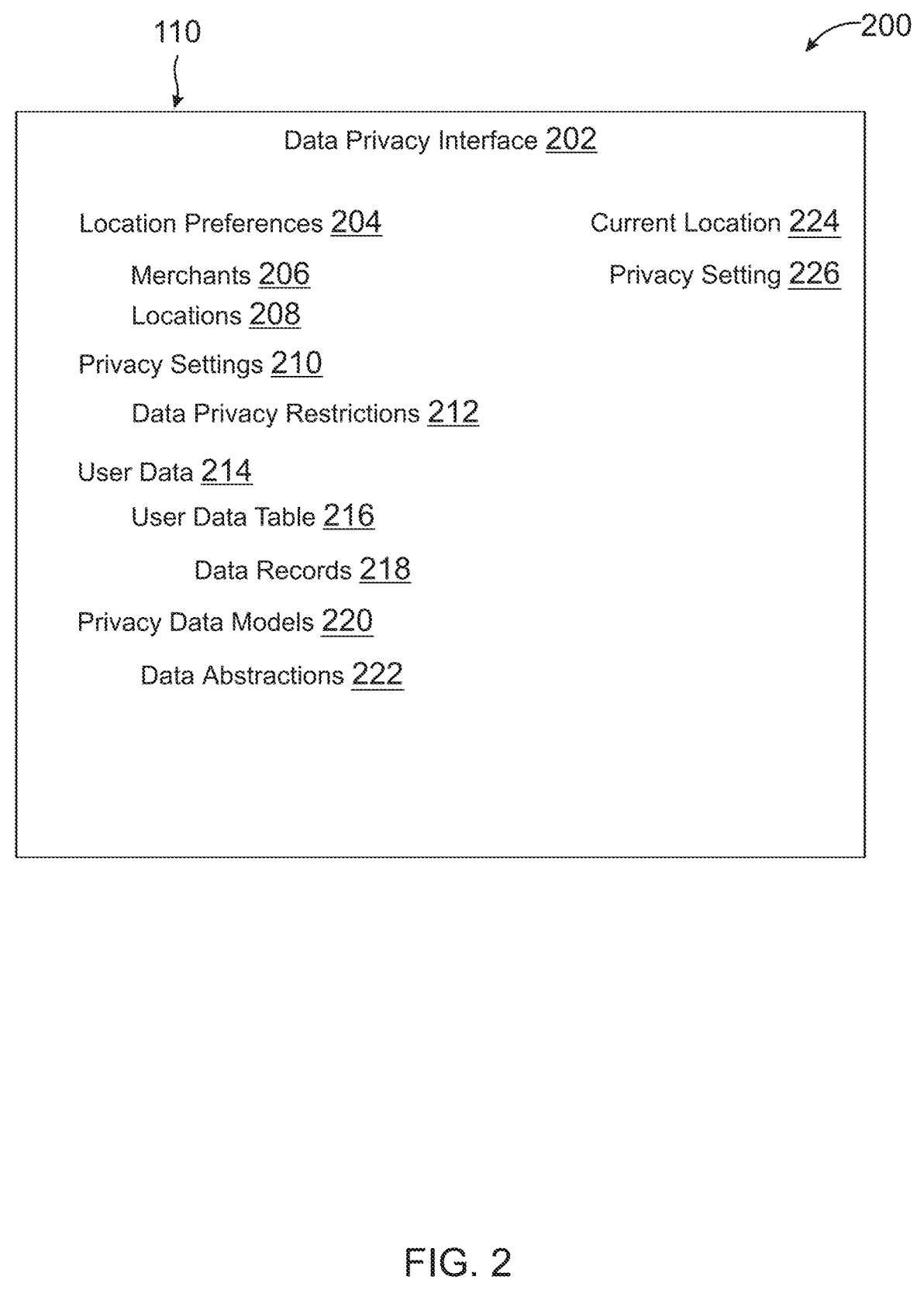

110

200

Data Privacy Interface 202

Location Preferences 204

Merchants 206

Locations 208

Privacy Settings 210

Data Privacy Restrictions 212

User Data 214

User Data Table 216

Data Records 218

Privacy Data Models 220

Data Abstractions 222

Current Location 224

Privacy Setting 226

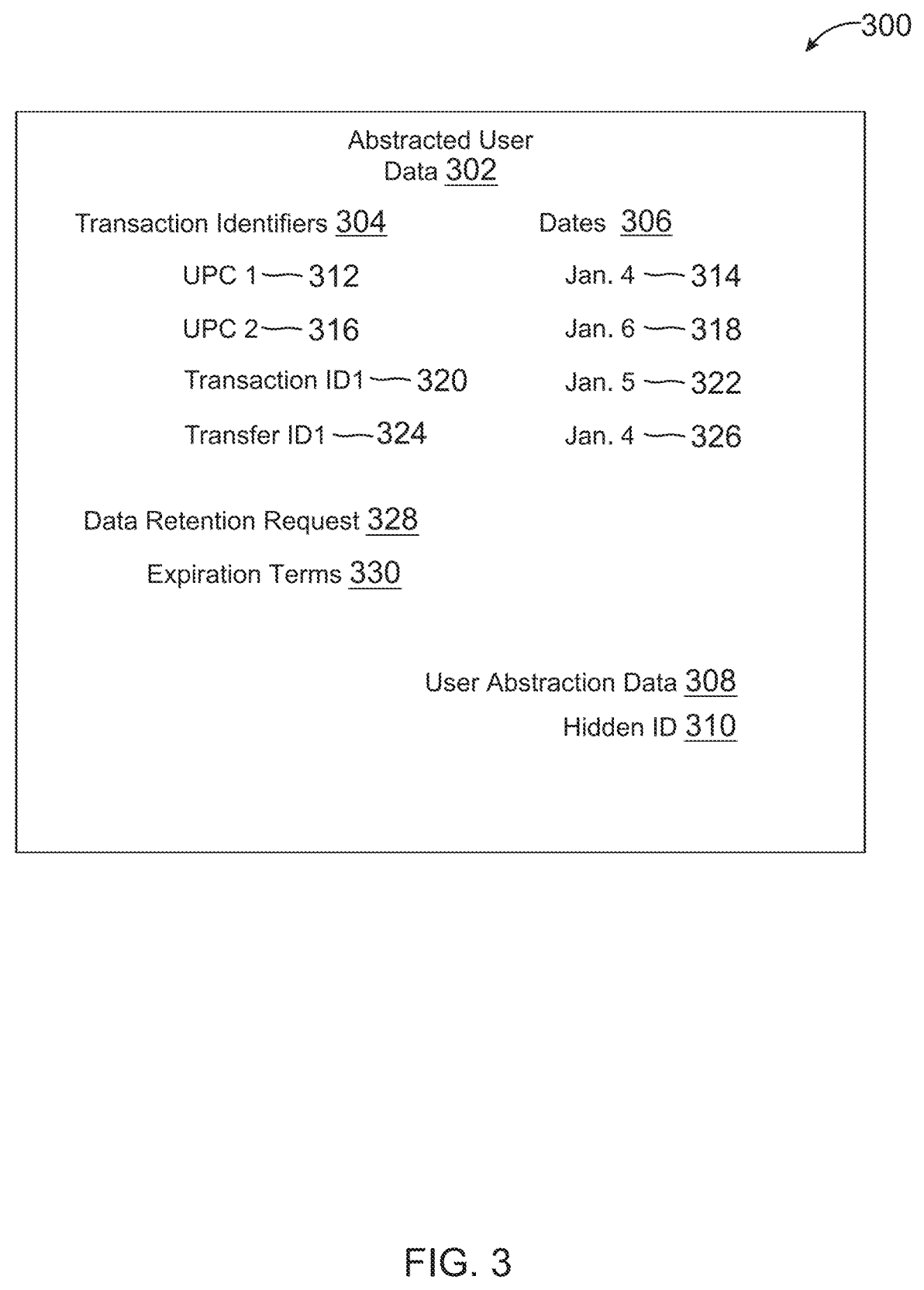

Abstracted User
Data 302

Transaction Identifiers 304         Dates 306

UPC 1 —— 312        Jan. 4 —— 314

UPC 2 —— 316        Jan. 6 —— 318

Transaction ID1 —— 320        Jan. 5 —— 322

Transfer ID1 —— 324        Jan. 4 —— 326

Data Retention Request 328

Expiration Terms 330

User Abstraction Data 308

Hidden ID 310

FIG. 3

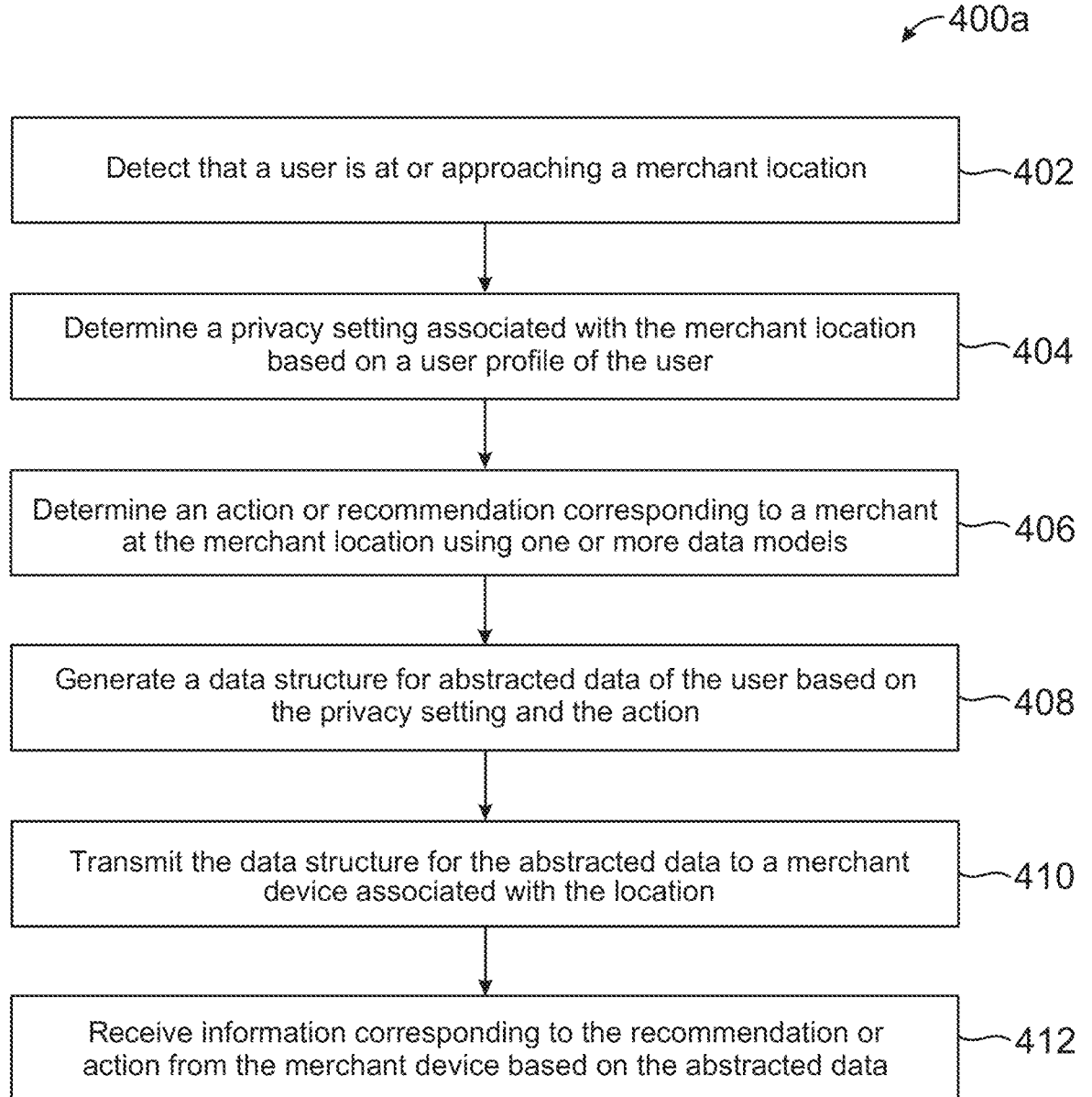

400a

Detect that a user is at or approaching a merchant location — 402

Determine a privacy setting associated with the merchant location based on a user profile of the user — 404

Determine an action or recommendation corresponding to a merchant at the merchant location using one or more data models — 406

Generate a data structure for abstracted data of the user based on the privacy setting and the action — 408

Transmit the data structure for the abstracted data to a merchant device associated with the location — 410

Receive information corresponding to the recommendation or action from the merchant device based on the abstracted data — 412

FIG. 4A

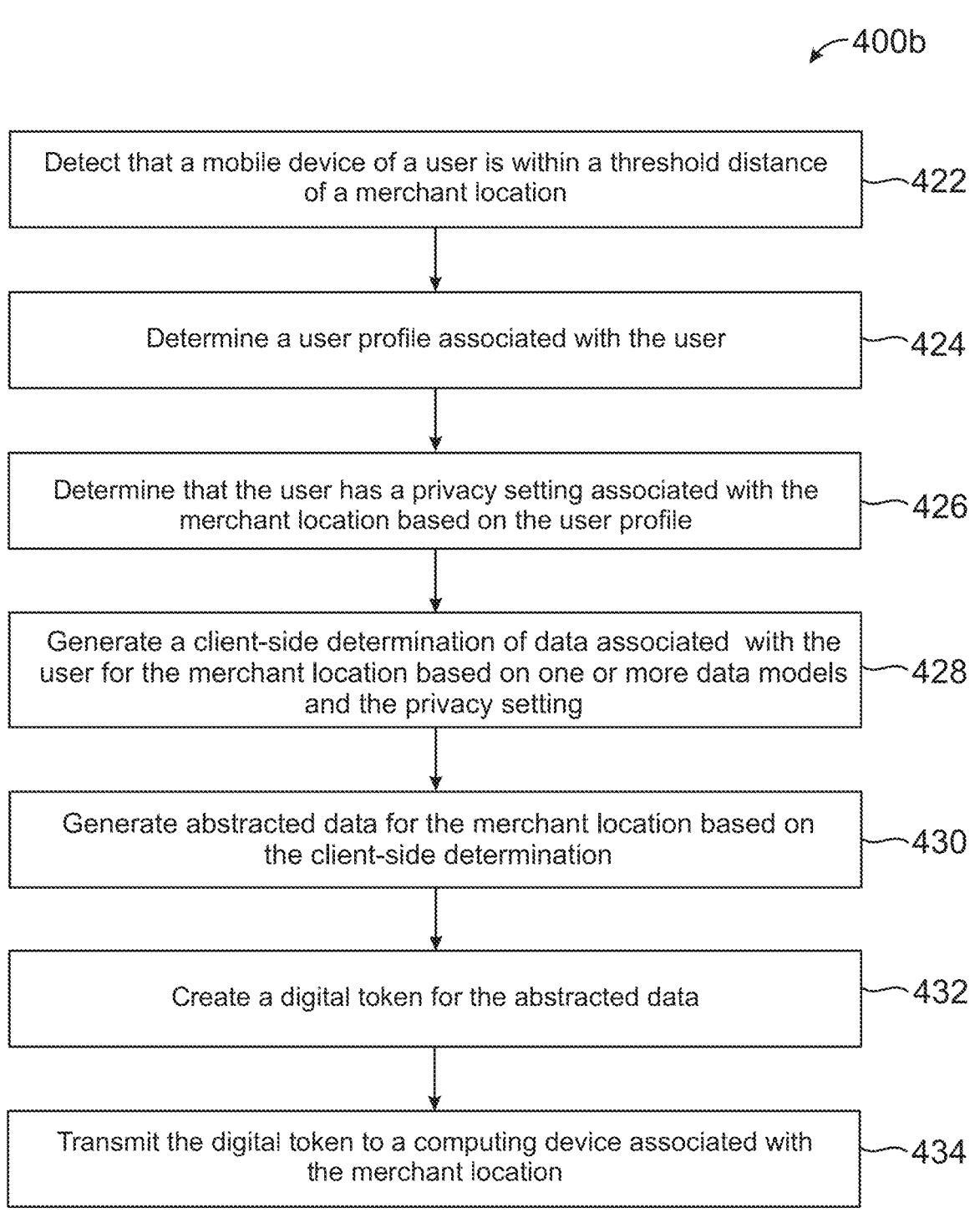

400b

Detect that a mobile device of a user is within a threshold distance of a merchant location ~422

Determine a user profile associated with the user ~424

Determine that the user has a privacy setting associated with the merchant location based on the user profile ~426

Generate a client-side determination of data associated with the user for the merchant location based on one or more data models and the privacy setting ~428

Generate abstracted data for the merchant location based on the client-side determination ~430

Create a digital token for the abstracted data ~432

Transmit the digital token to a computing device associated with the merchant location ~434

FIG. 4B

ON-DEVICE DATA PRIVACY OPERATIONS TO PREVENT DATA SHARING AT USER LOCATIONS

CROSS-REFERENCE TO RELATED APPLICATIONS

This application is a continuation of U.S. patent application Ser. No. 17/683,192, filed Feb. 28, 2022, all of which is incorporated by reference herein in its entirety.

TECHNICAL FIELD

The present application generally relates to data privacy operations on computing devices of users, and more particularly to providing abstracted user data to computing devices associated with user and/or merchant locations for improved data privacy of users when visiting those locations.

BACKGROUND

Users may utilize various mobile computing devices, such as tablet computers, smart phones, and wearable computing devices, to perform computing operations and communications at different locations including those for merchants and other entities that may collect user data. For example, during everyday activities, users may encounter various situations where the users utilize computing devices while at merchant locations to search for, locate, and/or purchase items. This may include utilizing computing devices at locations to perform electronic transaction processing, view content, such as maps and/or directions, search for items and services, and the like. Mobile computing devices that interact with devices associated with locations may share data of a user and that data may be used to track users and/or offer location-specific services, advertisements, offers, recommendations, and the like. While advantageous to merchants or service providers, users may not want to share personal and/or private data, as well as the users may desire to remain anonymous and/or avoid being tracked. Further, data privacy laws and regulations, as well as merchant policies, may prevent sharing and/or tracking of certain user data. However, data may be unintentionally shared by a user's mobile computing device contrary to a user's desired privacy levels. Therefore, there is a need for on-device data privacy operations to prevent undesired or unintentional sharing of user data.

BRIEF DESCRIPTION OF THE DRAWINGS

FIG. 2 is an exemplary user interface showing operations to select and establish privacy settings on a computing device for sharing of user data at locations, according to an embodiment;

FIG. 3 is exemplary data table of abstracted user data from one or more data models that may be provided to one or more devices associated with a location of a user, according to an embodiment;

FIG. 4A is a flowchart for determining actions that may be taken by a merchant with a user at a merchant location based on corresponding abstracted data, according to an embodiment;

FIG. 4B is a flowchart for on-device data privacy operations to prevent data sharing at user locations, according to an embodiment.

Figure 1:
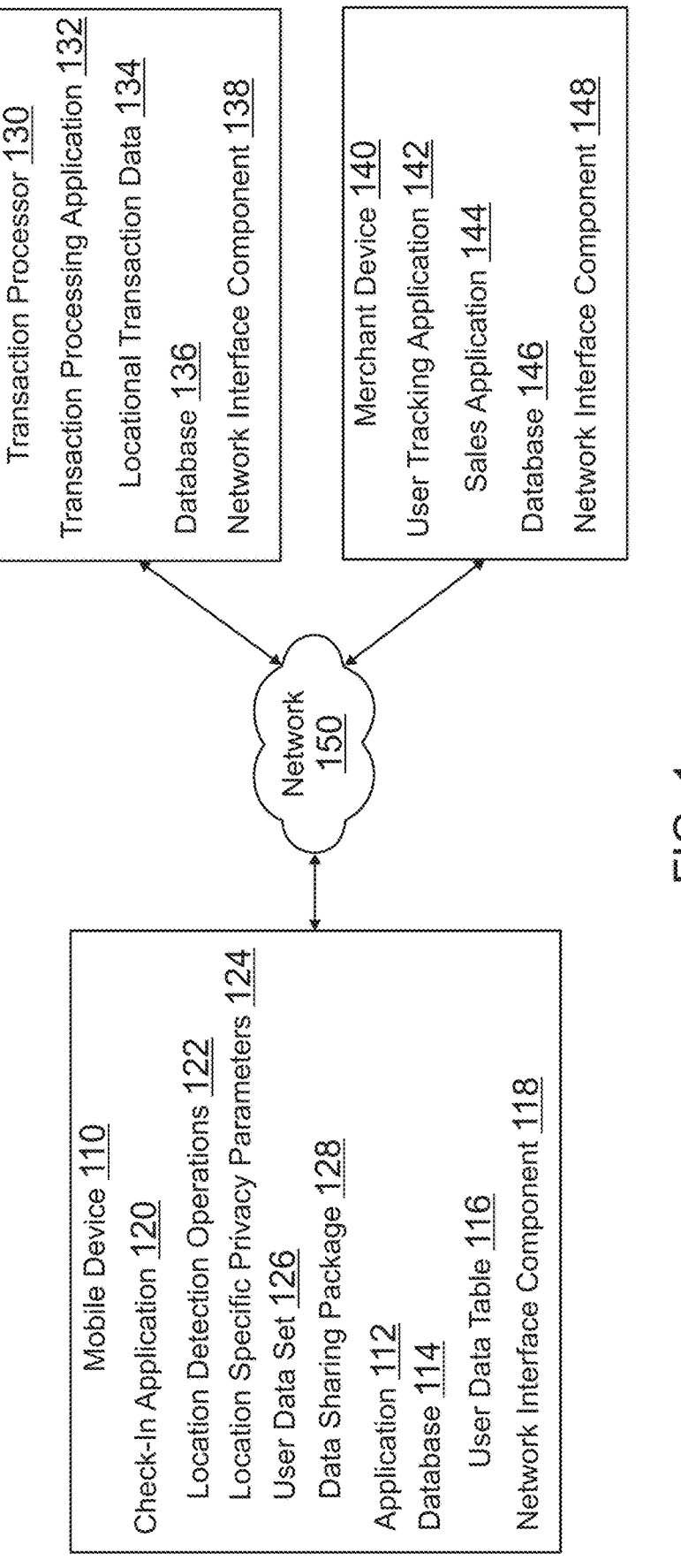
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for on-device data privacy operations to prevent data sharing at user locations. Systems suitable for practicing methods of the present disclosure are also provided.

An online service provider, such as an online platform providing one or more services to users and groups of users, may provide a platform that allows a user to utilize one or more accounts and other stored user data at different locations, such as merchant locations or merchants that may sell products, services, and other items to those users. The user data may be stored with the service provider and may also be locally stored on a computing device of the user, such as a mobile computing device. Devices for merchants and other locations discussed herein may be location-specific and may be used to provide data and computing services to users. However, in order to protect user privacy, data models, such as predicted recommendations, actions, and/or activities of a user and corresponding privacy settings, may be used on the user's mobile computing device to determine abstracted user data and/or information about those recommendations, actions, or activities that may be provided to a device associated with a location that the user is at or is travelling to. This may allow users to better protect their privacy, as well as enable service providers to better comply with regulatory laws and requirements for data privacy and security with certain locations. A user may be detected at or approaching a location and/or geofenced area, and a user profile for the user with a service provider may be identified. User activities by the user may be predicted, detected, and/or monitored, which may be activities at the location and/or as the user is approaching the location (e.g., an intent to perform other activities at the location). Using one or more data models, available and/or past user data, and privacy settings, the user's device may generate the abstracted data to hide or obscure identification and/or user data of the user when provided to the location's device.

In order for a user to utilize these services, an online service provider (e.g., an online transaction processor, such as PAYPAL®) may provide account services to users of the online service provider, as well as other entities requesting the services. A user wishing to establish an account may first access the online service provider and request establishment of an account. An account and/or corresponding authentication information with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments. This information may be used to process transactions for items and/or services including purchases associated with a location visited by a user that may utilize one or more devices, servers, and/or databases to obtain, track, and/or record user data and provide targeted advertisements, messages, and services to the user. Further, the incentives and past purchases may be provided to the user based on user data. In some embodiments, the account creation may establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and other transaction processing services. This application may be used to abstract user data using data models, on-device data tables and records, and/or privacy settings. However, other service providers may also provide the computing services discussed herein by providing on-device applications and computing services to abstract user data.

Once the account of the user is established with the service provider, the user may utilize the account via one or more computing devices and corresponding applications, web browsers, and the like. The computing device(s) may include a personal computer, tablet computer, mobile smart phone, or the like. The user may engage in one or more online or virtual interactions that may be associated with electronic transaction processing, images, music, media content and/or streaming, video games, documents, social networking, media data sharing, microblogging, and the like. This may be performed at certain locations and/or when travelling to or approaching those locations. A service provider may first detect, via the user computing device, a geolocation of a user and/or movement of the user, such as if the user is located within a geofenced area, is approaching a geofence or other location, and/or located at a specific location. The service provider may utilize a geolocation detection component of the user's computing device, such as a mobile smart phone, or may detect the user and/or the user's device using other devices associated with the location visited or to be visited by the user. For example, the service provider may also detect the user at or approaching a location using a cellular network provider, such as through cellular towers and/or triangulation using the cellular towers. In some embodiments, the cellular network provider (e.g., 5G provider) may provide location-specific devices and/or short-range wireless devices that may be used for user and/or device locations.

The user may be detected as approaching the location or geo-fenced area based on a movement of the user over a time period, such as a direction, velocity, acceleration, vector, or the like of the user. When a user is detected at or approaching a location, which may correspond to determining the user is within a specific location, geo-fenced location or area, and/or approaching a location or geo-fenced area, the user's device, account, and/or on-device application (e.g., a resident mobile application on a mobile smart phone) may determine data privacy settings, preferences, and/or models for the user. For example, a user profile of a user on the computing device (e.g., mobile smart phone) of the user may include one or more privacy settings and/or preferences of the user, which may indicate allowable user data, identification data, and the like that is shareable by the device on behalf of the user when at or traveling to the location. The user profile may further include privacy interests, preferences, activities, and other attributes set by the user and/or learned over time based on past user behaviors and privacy activities (e.g., hiding specific data from certain locations, merchants associated with locations, and/or users or other entities associated with or at locations). In this regard, the user profile and corresponding privacy settings may include and/or be used to determine one or more data models of user data that is shareable on behalf of the user and/or used to hide or obscure user data and/or identifying information of the user, the user's device, and/or the user's activities.

In some embodiments, the data models may correspond to a selected set of data that is shareable and/or designated for hiding/obscuring with particular locations and/or merchants. For example, the user may designate that a name, phone number, email address, and/or other information is not shareable with a merchant A but other information (e.g., a name, phone number, email address, etc.) is shareable with a merchant B. Thus, the data models may correspond to predictive computing services, instructions, and/or rules that may be used to determine and/or predict data that may be shareable and/or designated for hiding with particular merchants, locations, or the like when user data is requested from the device and/or the user visits the location and provides data to the location. The models may also be used to determine activities or the like that a user may engage in, request, or require when visiting a merchant location. For example, the models may be used to predict or determine that a user may want information and/or discounts associated with an interest in certain information by the user, and that the merchant may execute actions or provide recommendations based on that information. The model may therefore be used to make a client-side determination of one or more recommendations or actions that a merchant may want to take with a user (e.g., by providing information, an interactive map, a discount, an item comparison).

A machine learning (ML) or other artificial intelligence (AI) model associated with privacy settings, customer behaviors, interests, and/or other activities when visiting certain locations may be used to predict an interest of the user at the location, such as an item of interest, another activity the user may be interested in performing, a sub-location of interest to the user. For example, the ML model may anticipate a potential purchase of the user at the location and the corresponding data that would be helpful or beneficial to provide to the user to facilitate that purchase. The ML model may therefore predict and/or determine one or more recommendations or actions a merchant may want to take, provide, or perform with the user in order to provide relevant data to the user. For example, the ML model may provide a recommendation or action to a merchant to engage the user, while abstracted information associated with the user (e.g., by not including or hiding identification information for the user, the user's device, and/or the user's account) may be provided to the merchant for the merchant to provide the recommendation or action.

Thus, a client-side determination of one or more recommendations or actions for a merchant to take may be determined by the user's computing device, such as their mobile smart phone. In response to the client-side determination, information corresponding to the one or more recommendations, actions, or the like may be abstracted based on the client-side determination and one or more privacy settings of the user (which may be associated with the merchant and/or merchant location. The abstracted information may correspond to and/or include item, interest, user, and/or other data associated with the action or recommendation for the merchant to take with user at the location, while still obscuring certain other user and/or identification information. In this regard, an ML or other AI model may be utilized to predict user interests and activities that a user may perform at a location as a client-side determination, and what data may be necessary or desirable for the merchant when providing one or more recommendations or actions with the user. The ML or AI model may reside on the user's device and/or be provided by the service provider associated with managing the user's data and data privacy. Based on a predictive output of the ML or AI model, an abstraction of the user's data may be generated to share certain data with one or more devices associated with the location. This may be based on past behaviors of the user, including past purchases, past activities, and the like. The user profile may also include preferences specifically established by the user for different locations and/or merchants.

The abstracted data may include sharing certain data associated with actions or recommendations for a merchant to take with one or more devices associated with a location and/or merchant may also be learned and/or depend on a reason for the user's visit to the location. For example, the ML model may establish or predict that the user is visiting a merchant location to purchase cough syrup for a sick family member or perform another specific task. The ML model may also consider similar user behaviors of the user and/or other users (e.g., based on training data) to predict what may be a reason for a visit to a location. The past behaviors may include information associated with a gait, one or more movements, an age, a demographic, a customer architype, a route through the location, or past activities at the location by other users in the past. Further, the past behaviors may be associated with purchases, activities, and/or sub-locations for the other users based on the information about their past behaviors. Once a reason for visiting a location is determined or predicted, a recommendation or action for the merchant may be determined, which may be abstracted to prevent revealing or providing identification information corresponding to the user when shared with the location. For example, with the aforementioned cough syrup scenario, it may be predicted that the user may want to view price comparisons and/or purchase a specific brand based on past purchases. However, providing this information and/or requesting that the merchant provide a recommendation or action to the user may include identification or personal information, which may be abstracted when requesting that the merchant provide a recommendation (e.g., similar brand at different prices) or action (e.g., an attendant assistance or map to a location) to the user.

Based on the data model, the user's device may generate an abstracted form of data for the merchant's recommendations or actions to take with the user that shares specific data with one or more devices associated with the location, while hiding, obscuring, and/or requesting deletion (e.g., no permanent storage) of identification data corresponding to the user. In this regard, the data may correspond to at least a portion of data for the merchant that is designated to be shared based on the data models prediction for a recommendation or action to take with the user, which may abstract and/or be used to hide an identity of the user (e.g., by removing and/or scrubbing of names, addresses, contact details, digital addresses and/or identifiers, sufficient demographic and/or characteristics of the user, etc.). In order to generate abstracted information that is shareable with one or more devices associated with the location of the user or being visited by the user, information corresponding to the recommendations or actions predicted to be useful to the merchant with the user may be scrubbed or otherwise removed of information identifying the user. This may include obscuring, scrubbing, or hiding names, addresses, account or contact identifiers, or the like. However, the abstracted data may retain sufficient information for the merchant to provide the predicted recommendations or actions to the user.

In some embodiments, a data table stored on the user's device and/or accessible by the user's device may be utilized. For example, the data table may correspond to one or more database records or storage mechanics, which may include rows for different data records associated with the user. This may be used to generate the abstracted user data, which may then be tokenized and/or transmitted with one or more devices associated with the location in order to receive targeted services from such device(s). With merchant locations, shareable data may include past transaction information and/or information associated with items and transactions of interest to a user, which may be used to provide a recommendation or action to the user by the merchant. In some embodiments, the data table may include records that include at least one item identifier (e.g., a stock-keeping unit (SKU) or universal product code (UPC) barcode or other displayable code), a date of purchase or interest in the item, and/or other information that may be relevant to provide the recommendation or action by the merchant to the user. In this regard, the data table may not include or may be scrubbed when used of user information and/or identifying information, including social security number, account numbers, mailing address, billing address for funding instruments, email address, phone number, and the like. The data table that may reside on the computing device of the user and/or be accessible by an application on the computing device may then be used to create an abstracted data set, records, and/or data structures that may be shareable with one or more devices associated with the location of the user and/or to be visited by the user. The abstracted data for the user may also be based on other accessible data and/or database tables and records. For example, a data table that includes user identification information and/or identifiers may be scrubbed of such data prior to being tokenized, transmitted, and/or shared with a device associated with a location so that more abstracted data that is not usable to identify or track the user may be provided while still allowing the user to receive targeted notifications, messages, advertisement, and/or information.

Using the abstracted data, a digital token may be generated that may be used to share the abstracted data. The digital token may include the abstracted data and/or may be used to access abstracted data from the user's device and/or a backend data storage provider. The digital token may be generated on the user's device so that the device of the user may transmit and/or share the digital token with one or more other devices. In this manner, data may be shared while alleviating data privacy concerns that a user may have by providing and/or maintaining user data with devices associated with locations. In various embodiments, the data that is exchanged with the device(s) associated with the location may be used by the merchant to provide back to the user's computing device (e.g., mobile smart phone) recommendations, information, and/or actions available to be conducted at the location. For example, the abstracted data may be provided to the merchant's device and/or merchant location's device may be used to provide back data for a data loading process or operation executed via an application of the user's device. This may include location-specific data or operations. The data provided back to the user's device may include transaction data including data for predicted purchases and/or past purchases by the user, including receipts or transaction histories that may be relevant to the user (e.g., for a return, additional purchase, or the like). The data may also correspond to a map, which may be interactive, of items and/or sub-locations at the location that may be relevant to the user. Other data may include loyalty or rewards accrued by and/or available to the user, as well as other payment mechanisms and/or instruments that may be utilized by the user at the location. Data for identification and/or authentication of the user at the location may also be provided back to the user's device so that the user may facilitate a purchase and/or checkout in an expedited manner.

Other information, recommendations, and/or actions provided back to the user's computing device in response to the abstracted information may include recommendations, advertisements, messages, and/or products that are targeted to the user based on the shared and abstracted information. For example, a predicted item of interest and/or potential purchase by the user may be determined by the merchant from the abstracted data, and information for locating, purchasing, and the like may be provided to the user's computing device. This may include maps and data visualizations, as well as other advertisements that may be relevant to the user. While the user is at the location, the user may engage in further actions and activities, which may indicate other interests of the user. For example, the user's computing device and/or one or more location-specific devices may monitor or detect one or more activities by the user at the location and/or while the user approaches the location. The types of activities may correspond to travel routes, purchases or item selections, use of the user's mobile device (e.g., opening and/or using applications, providing input including searches for items and/or locations, communicating with other users, social networking or microblogging, electronic transaction processing, and the like), and other activities. The activities may be monitored through the user's device or utilize one or more devices and/or sensors associated with the location. For example, activity on the user's device may be monitored, however, IoT sensors, point-of-sale (POS) devices, merchant terminals, and the like may also detect activities of the user or generate data associated with the activities that may be monitored.

Based on the monitored information, the user's computing device may generate an updated abstracted data and/or data model for the user and may provide such data to one or more devices associated with the location to receive additional information and/or services. This may include determining additional predicted actions or interests of the user at the location and/or providing additional recommendations, incentives, offers, and the like to the user for the location. For example, one or more devices may monitor additional activities by the user at the location, including those activities engaged in based on the data provided to the user's computing or mobile device. Additional activities and abstracted data to share based on these activities may be limited based on privacy settings by the user and/or opt-in/ opt-outs to data sharing rules and parameters for the user. Data may also be limited and/or prevented from being shared based on a privacy regulation, law, standard, practice, or policy, or the like associated with a location, region, merchant, or other affected location and/or entity. In this manner, a user may utilize on-device data and data privacy operations to limit data sharing and provide more enhanced data privacy. This may further include provide real-time assessments and data share models and predictions based on locations and user behavior. This may provide faster and more coordinated data sharing and privacy restrictions during data transmissions.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a mobile device 110, a transaction processor 130, and a merchant device 140 in communication over a network 150. Mobile device 110 may be used to establish an account with transaction processor 130 and/or another service provider, which may include user data and/or identification data for the user. Mobile device 110 may be in possession of the user as the user approaches a location and may include the user and/or identification data. In order to provide enhanced on-device data privacy at locations, mobile device 110 may include one or more user profiles having data privacy settings usable with data models to provide abstracted user data. This abstracted user data may be used to hide all or a portion of the user and/or identification data when transmitted to merchant device 140 associated with a location of the user or that the user is visiting or is intending to visit.

Mobile device 110, transaction processor 130, and merchant device 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Mobile device 110 may be implemented using any appropriate hardware and software configured for wired and/or wireless communication with transaction processor 130, merchant device 140, and/or other devices and/or servers for data communications, which may include determining and providing abstracted data for a user when the user is at or approaching a location. Mobile device 110 may correspond to an individual user, consumer, or merchant that utilizes a platform provided by transaction processor 130 and/or other devices or servers for data storage, processing, and retrieval. In various embodiments, mobile device 110 may be implemented as a personal computer (PC), a smart phone, laptop/ tablet computer, wristwatch with appropriate computer hardware resources, other type of wearable computing device, and/or other types of computing devices capable of transmitting and/or receiving data. Although only one computing device is shown, a plurality of computing device may function similarly.

Mobile device 110 of FIG. 1 contains a check-in application 120, an application 112, a database 114, and a network interface component 118. Application 112 may correspond to executable processes, procedures, and/or applications with associated hardware. In other embodiments, mobile device 110 may include additional or different software as required.

Check-in application 120 may correspond to one or more processes to execute software modules and associated components of mobile device 110 to provide features, services, and other operations for data privacy associated with a location of a user when the user is at or will be visiting a location that may utilize one or more devices to determine, track, and/or store data for the user when visiting the location. In this regard, check-in application 120 may correspond to specialized software utilized by a user of mobile device 110 that may be used to access a user profile and/or user account that includes privacy settings and, utilizing data models for data shareable and/or transferrable to other devices, generate abstracted user data that may be tokenized and/or transmitted to other devices. In this regard, check-in application 120 may include location detection operations 122, which may be used to detect when a user is at and/or approaching a location. Location detection operations 122 may include geo-location detection operations, geo-fence detection and/or correlation operations (e.g., to determine when a user is in and/or approaching a geo-fenced area), and/or other location detection operations that may interact with devices, servers, and transceivers to determine a location of mobile device 110. Location detection operations may also include check-in operations and processes, for example, to establish a location of mobile device 110 and/or set a predicted location that mobile device 110 will be at during one or more future time period. Additionally, location detection operations and location-specific privacy parameters 124 may be used by and/or include one or more ML models and algorithms to predict user locations, activities, and/or desired user data privacy settings.

For example, check-in application 120 may include ML models that may make predictions about why a user is visiting a location, an interest of the user at the location, recommendations and/or actions that a merchant may take with the user at the location, and/or whether the user would like to ensure data privacy by obscuring, hiding, or abstracting certain user and/or identification information. These may be used to provide a predictive output based on features from the input data. When building ML models training data may be used to generate one or more classifiers and provide recommendations, predictions, or other outputs based on those classifications and the ML model. The training data may be used to determine input features for training predictive scores for contextually relevant data for check-in application 120, such as the recommendations and/or actions a merchant may take with and/or provide to the user. In some embodiments, the decisions may be based on a user data set 126 and used to generate a data sharing package 128 that abstracts certain user and/or identification information. For example, ML models may include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output scores or classifications. Within the input layer, each node may correspond to a distinct attribute or input data type that is used to train ML models.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML models that attempt to classify or predict activities associated with check-in application 120, which may be based on location detection operations 122, location-specific privacy parameters 124, and/or user data set 126 (e.g., on-device user and/or identifying information that may be abstracted). These predicted activities may correspond to user activities at locations, as well as merchant recommendations or actions to take with the user at the location.

This information regarding user activities/interests, as well as merchant recommendations and actions to provide to the user, may be used to generate data sharing package 128 as a data package and/or digital token having an abstracted information that may be provided by mobile device 110 to other devices when at or approaching a location. Thus, when ML models are used to perform a predictive analysis and output, the input may provide a corresponding output based on the classifications, scores, and predictions trained for ML models. The output may correspond to a recommendation and/or action that a merchant may take with a user to provide a merchant service, advertisement, location-based information, or the like that may be relevant and/or of interest to the user. As such, data sharing package 128 may correspond to abstracted information associated with the recommendation or action for the merchant to take with the user. In other embodiments, the abstracted information may correspond to abstracted, scrubbed, or otherwise altered user data for the user, such as information about past activities, interests of the user, or the like that may include user identification information hidden or scrubbed in data sharing package 128.

ML models may be trained by using training data associated with past user behaviors and activities at locations, as well as location detection operations 122, location-specific privacy parameters 124, and/or user data set 126. By providing training data to train ML models, the nodes in the hidden layer may be trained (adjusted) such that an optimal output (e.g., a classification) is produced in the output layer based on the training data. By continuously providing different sets of training data and penalizing ML models when the output of ML models is incorrect, ML models (and specifically, the representations of the nodes in the hidden layer) may be trained (adjusted) to improve its performance in data classification. Adjusting ML models may include adjusting the weights associated with each node in the hidden layer. Thus, the training data may be used as input/output data sets that allow for ML models to make classifications based on input attributes.

The output classifications for ML models trained for prediction of interests, contextually relevant data, and/or activities may be classifications of likelihood of a user requiring privacy-based data that abstracts and/or hides user and/or identification information when provided by mobile device 110 at a location. Such classifications may further be based on additional data, such as a gait, an age, a demographic, a customer architype, a route through the location, or past activities at the location. Further, it is also understood that the determination and provision of the data may also be performed by transaction processor 130 when providing data to mobile device 110, where the data may then be stored on and provided by mobile device 110. As such, one or more of ML models may be utilized and/or provided on transaction processor 130 for predictive analysis.

Based on one or more data models, ML model predictions, and the like, abstracted information corresponding to the recommendation or action for the merchant, as well as of certain data from user data set 126 in some embodiments, may be selected, modified, and/or generated in order to provide abstracted versions of location-specific data for the user. The abstracted data may correspond to data sharing package 128, which may be tokenized as a digital token or other digital representation that may be shareable and/or transmissible to one or more devices associated with a location including merchant device 140 that is associated with a merchant location. Thereafter, one or more notifications, products, services, or other items may be provided back to mobile device 110. This may be location-specific for mobile device 110 and/or to which mobile device 110 is being brought. However, the provided items and notifications may be based on abstracted data that hides or obscures an identity of the user, and thus may not be specifically used to identify and/or track the user. Additionally, data sharing package 128 may request deletion of shared data and/or activities or other data tracked of the user while the user is at the location or after the user has left the location.

Application 112 may correspond to one or more processes to execute software modules and associated components of mobile device 110 to provide features, services, and other operations for a user over network 150, which may receive data from transaction processor 130 and/or merchant device 10 for output via application 112 at a location. In this regard, application 112 may correspond to specialized software utilized by a user of mobile device 110 that may be used to access a website or UI to perform actions or operations. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 150, including retrieving website information (e.g., a website for a merchant), presenting the website information to the user, and/or communicating information to the website.

However, in other embodiments, application 112 may include a dedicated application of transaction processor 130 or other entity (e.g., a merchant). Application 112 may be associated with account information, user financial information, and/or transaction histories. In further embodiments, different services may be provided via application 112, including messaging, social networking, media posting or sharing, microblogging, data browsing and searching, online shopping, and other services available through service provider server 120. Thus, application 112 may also correspond to different service applications and the like that are associated with a location, merchant, service provider, transaction processor 130, and/or merchant device 140.

In this regard, application 112 may be used to detect mobile device 110, and the corresponding user, as at or approaching a location, such as through a location detection component (e.g., GPS sensor and/or component, mapping application or process, compass process, or the like). Application 112 may further be used to monitor user activities at the location and/or as the user approaches the location, including interactions and activities on mobile device 110, detectable using mobile device 110 or a connected device (e.g., biometrics including heart rate, gait or walking speed, etc.), electronic transaction processing, and the like. Application 112 may provide the activities to merchant device 140 and/or may be used to process received data from merchant device 140. This may include electronic transaction processing services using an account of a user with transaction processor 130

Mobile device 110 may further include database 114 which may include, for example, identifiers such as operating system registry entries, cookies associated with application 112 and/or other applications, identifiers associated with hardware of mobile device 110, or other appropriate identifiers. Identifiers in database 114 may be used by a payment/service provider to associate mobile device 110 with a particular account maintained by the payment/service provider, such as transaction processor 130. Database 114 may also further store entered and/or detected user and/or identification data and activities, which may be monitored on mobile device 110 and shared with one or more devices while maintaining a privacy of the user.

Mobile device 110 includes at least one network interface component 118 adapted to communicate with transaction processor 130, merchant device 110, and/or another device or server (including location-associated devices for sharing of abstracted data) over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction processor 130 may be maintained, for example, by an online service provider, which may provide operations for electronic transaction processing, as well as those for providing user data that may be used for on-device data privacy operations for mobile device 110. Various embodiments of the data privacy processes described herein may be provided by mobile device 110 and may data for data privacy be accessible by mobile device 110. In such embodiments, transaction processor 130 may interface with mobile device 110 for detecting a user's location and/or monitoring user activities at a location. Transaction processor 130 includes one or more processing applications which may be configured for electronic transaction processing. In one example, transaction processor 130 may be provided by PAYPAL®, Inc. of San Jose, CA, USA. However, in other embodiments, transaction processor 130 may be maintained by or include another type of service provider.

Transaction processor 130 of FIG. 1 includes a transaction processing application 132, a database 136, and a network interface component 138. Transaction processing application 132 may correspond to executable processes, procedures, and/or applications with associated hardware. In other embodiments, transaction processor 130 may include additional or different modules having specialized hardware and/or software as required.

Transaction processing application 132 may correspond to one or more processes to execute modules and associated specialized hardware of transaction processor 130 to provide data, operations, and processes for electronic transaction and/or provisioning user, identification, and/or transaction data to mobile device 110. In this regard, transaction processing application 132 may correspond to specialized hardware and/or software used by a user associated with mobile device 110 to establish an account with transaction processing application 132 and/or access another account with transaction processor 130 or another service provider. For example, an account provided by PAYPAL® may be utilized to provide services to users. In various embodiments, financial information may be stored to the account, such as account/card numbers and information. A digital token for the account/wallet may be used to send and process payments, for example, through an interface provided by service provider server 140. In some embodiments, the financial information may also be used to establish a payment account and provide payments through the payment account. However, a more general account (e.g., a telephone, email, mobile service provider, etc.) may also provide the aforementioned account services when utilizing transaction processing application 132. In other embodiments, transaction processing application 132 may also or instead use user profiles stored by database 136, which may include user data, identification data, and/or transaction data such as locational transaction data 134.

Transaction processing application 132 may therefore be used to process a transaction associated with locational transaction data 134. Transaction processing application 132 may be used to process payments and other services to one or more users, merchants, and/or other entities for transactions associated with locations visited by merchant device 110 and/or other devices. The payment account may be accessed and/or used through a browser application and/or dedicated payment application. Transaction processing application 132 may be used to process and/or store locational transaction data 134, such as using an application/website or at a physical merchant location, for one or more items. Items may also be recommended and/or notifications provided based on abstracted user data models provided by mobile device 110 to merchant device 140. In some embodiments, transaction processing application 132 may further be used to provide rewards, incentives, benefits, and/or portions of a cost or price of a transaction based on the transaction being processed. Transaction processing application 132 may process the payment and may provide a transaction history for transaction authorization, approval, or denial.

Additionally, transaction processor 130 includes database 136. Database 136 may store various identifiers associated with mobile device 110 and/or merchant device 140, which may be associated with user data, merchant data, identification data, transaction data, and the like. Database 136 may also store account data, including payment instruments and authentication credentials, as well as transaction processing histories and data for processed transactions. Database 136 may further store user profiles, which may be used by transaction processing application 132 when determining data to transfer and/or exchange with mobile device 110 for on-device privacy settings and sharing. As such, user profiles in database 136 may include information about one or more users' interests, preferences, past activities and behaviors, account data, available funds and/or rewards, and the like. Computer or machine executable instructions may also be stored in database 136 or in a separate storage or database, where the instructions, when executed, enable a system or processor to perform operations as described herein.

In various embodiments, transaction processor 130 includes at least one network interface component 138 adapted to communicate mobile device 110, merchant device 140, and/or another device/server for a merchant over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Merchant device 140 may be maintained, for example, by a merchant or other entity that provides items for sale to users at locations visited by users. Merchant device 140 may provide the items for sale, as well as provide operations for advertisement, marketing, item directory or information, and payment processing. In this regard, merchant device 140 may include and/or be associated with a device that may receive user and/or identification data as a user visits or is traveling to the corresponding location, where the data may be abstracted based on one or more data models to provide abstracted user data that hides or obscures a user's identification, personal or transactional information, and the like to protect data privacy based on privacy settings. In some embodiments, merchant device 140 may be implemented as a single or networked personal computers (PCs), a smart phone, laptop computer, wearable computing device, and/or other types of computing devices. Although only one merchant device is shown, a plurality of merchant devices may function similarly.

Merchant device 140 of FIG. 1 contains a user tracking application 142, a sales application 144, a database 146, and a network interface component 148. User tracking application 142 may correspond to executable processes, procedures, and/or applications with associated hardware. In other embodiments, merchant device 140 may include additional or different software as required.

User tracking application 142 may correspond to one or more modules and associated components of merchant device 140 to receive user and/or identification data and track such data, including interfacing with sales application 144 and/or database 146 to provide location specific actions, notifications, and services based on received user data. In this regard, user tracking application 142 may correspond to specialized hardware and/or software utilized by merchant device 140 to receive abstracted information for one or more recommendations or actions to provide a user, as well as other potential user data, based on one or more data models from one or more privacy settings with a user profile of a user. Such abstracted data may hide or obscure user and/or identification data for a user and may be used to prevent or limit user data tracking based on on-device privacy settings and data models of mobile device 110. Thus, user tracking application 142 may receive this data and may utilize this data while the user it at the location to determine and/or execute actions with mobile device 110, as well as provide recommendations and/or other information. The abstracted data may also be requested to be deleted after a time period and/or when the user leaves the location, which may cause user tracking application 142 to remove/delete the data from storage and/or prevent long-term or persistent data storage of the abstracted data.

User tracking application 142 may also be used to provide mobile device 110 with data and/or determine data of relevance or interest to a user associated with mobile device 110 based on the received abstracted data. In this regard, user tracking application 142 may receive the data based on the privacy settings, which may be provided and/or pushed by mobile device 110 based on the user being at or approaching the location for merchant device 140, performing some activity at the location, requesting the data, or the like. User tracking application 142 may further include data or ML models to provide contextually relevant data to mobile device 110 based on the abstracted data and location-specific data for the location from sales application 144 and/or database 146. The models may make a prediction about an interest or contextually relevant data for the user associated with mobile device 110 at the corresponding location, for example, based on abstracted data for a recommendation or action that may be provided by the merchant to the user at the location. For example, the data may include a map, sub-location and/or layout, item or object locations, rewards and other available benefits, activities that may be engaged in, and the like. User tracking application 142 may also include one or more monitored activities of the user at or associated with the location, which may be used to provide, change, and/or update actions determined and provided to the user at the location, such as notification, offers, and/or advertisements for preferences, interests, past purchases, etc. of the user.

Merchant device 140 may further include sales application 144 that provides and/or processes items for sale with mobile device 110 and/or a user associated with mobile device 110 (e.g., using a payment card, cash, etc.). In certain embodiments, sales application 142 may be accessible over the Internet and provide for sales by mobile device 110 while a user is at or approaching a corresponding location. Sales application 144 may also correspond to a checkout application at a physical merchant location, such as the application(s) of a point-of-sale (POS) device used to provide sales at physical locations. Sales application 144 may be used to establish a transaction once a user/employee associated with merchant device 140 has selected one or more items for purchase. Once a payment amount is determined for the item(s) to be purchased by the user, merchant device 140 may request payment for the transaction. After input, merchant device 140 may then process a payment to the merchant associated with merchant device 140 using. Service provider server 140 may approve or deny the payment request.

Merchant device 140 may further include database 146 which may include, for example, identifiers associated with user tracking application 142, sales application 144, and/or other applications, identifiers associated with hardware of merchant device 140, or other appropriate identifiers. Database 146 may receive and store data from mobile device 110, such as in response to receiving the data when users are at or approaching a location associated with merchant device 140. Thus, database 146 may further include user data, which may be provided by mobile device 110. Database 146 may therefore further store, use, and/or delete abstracted data models of user and/or identification data, which may be provided based on privacy settings of users. In order to provide location-specific notifications and services, database 146 may further include location-specific data, such as location maps, item data, prices, transaction processing information, advertisements, discounts, and the like.

Merchant device 140 includes at least one network interface component 148 adapted to communicate with mobile device 110, transaction processor 130, and/or other devices or servers over network 150. In various embodiments, network interface component 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

FIG. 2 is an exemplary user interface 200 showing operations to select and establish privacy settings on a computing device for sharing of user data at locations, according to an embodiment. User interface 200 of FIG. 2 may be displayed by mobile device 110 discussed in reference to system 100 of FIG. 1. In this regard, mobile device 110 may provide data for display in user interface 200 in an application for user is establishing, setting, and/or changing data privacy settings and restrictions for use when visiting locations and communicating with devices associated with those locations.

User interface 200 on mobile device 110 may include a data privacy interface 202 that allows a user to establish, set, and/or change data privacy settings of users. The privacy settings may be used when a user visits a location, and may be utilized in order to abstract data in order to hide certain user and/or identification data. For example, different locations may have different layouts and may place some items in high visibility areas, while other items may be of lower visibility and hard to find. Users may wish to find items that may be more hidden, such as located in a back aisle or a hard-to-find place. Thus, users may want a map or instructions to locate specific items within a location or otherwise be directed to landmarks, interests, other users (e.g., service users, merchant employees), etc. Additionally, users may be interested in item comparisons and/or similar item information, as well as any available discounts, rewards, and the like when purchasing items. However, users may not want to share all or certain user and/or identification information, for example, to protect data privacy and/or avoid unnecessary communications and user tracking that may adversely affect the user or provide unwanted notifications. As such, the user may establish privacy settings for the user on the user's computing device (e.g., mobile smart phone), which may be used to generate on-device abstracted data from predicted merchant recommendations and/or actions to provide to the user, as well as on-device and/or network accessible data.

In this regard, data privacy interface 202 includes location preferences 204, privacy settings 210, and user data 214 utilized in order to provide abstracted data via digital tokens, transferrable data packages (e.g., data transmissible over a network or short-range wireless communications), and/or digital representations (e.g., bar or QR codes or other data via a display or output of a mobile device). Location preferences 204 may include merchants 206 and/or locations 208 that may establish one or more merchant names or identifiers and/or one or more locations, geo-location coordinates, and/or location identifiers (e.g., address, shopping or retail center, etc.) that may be designated for detection and generation of abstracted or hidden data for data privacy. In this regard, merchants 206 may establish multiple merchant locations for an overall merchant (e.g., a grocery, drug, or convenience store chain, a restaurant, etc.), where each location of the merchant is designated for one or more of privacy settings 210. Locations 208 may be used to designate more granular specific locations, but may also include multiple different merchants, storefronts, or sub-locations within an overall location. For example, a mall may be designated for hiding or abstracting of certain data for all storefronts within the mall.

Privacy settings 210 may include specific settings to hide, obscure, or otherwise abstract (e.g., by generalizing or providing higher level data, such as demographic data instead of a username or identifier) user and/or identification information for a user corresponding to mobile device 110. Privacy settings 210 include data privacy restrictions 212, which designate the specific data, data records, and/or features (e.g., components, column values or data, or the like) that are to be hidden or abstracted when providing data to a device associated with a location. Thus, privacy settings 210 may be associated with location preferences 204 to designate the data to hide at one or more locations and may be established for each of location preferences 204. However, privacy settings 210 may also more generally be established and one or more of privacy settings 210 may be set for multiple ones of merchants 206 or locations 208. Data privacy restrictions 212 may be used in order to determine abstracted user data as a structure, token, representation, or model that may be transferrable to a device associated with a location.

User data 214 may correspond to on-device and/or device accessible data associated with a user and/or recommendation/actions to provide to a user by a merchant, which may include identification data that may be used to specifically identify and/or track a user. User data 214 may reside locally on mobile device 110 and/or may be generated or fetched at a time of generating abstracted data based on a privacy setting, such as from a service provider, transaction processor, or external database. Thus, user data 214 includes a user data tables 216 having data records 218. User data table 216 corresponds to one or more database tables that includes data for a user and/or associated with recommendations/actions to provide to the user in one or more rows having different data components designated for the columns of the database tables (e.g., where the columns may correspond a username, identifier, transaction identifier, transaction cost, item identifier, etc., for a data table having rows recording transaction records of the user). Data records 218 may therefore be abstracted from identification information that may conventionally be associated with providing merchant services to the user. For example, data records 218 may include and/or be abstracted of data associated with a username, address, social security number, email address, phone number, etc., for a data table of user and identification data of the user. In this regard, user data 214 may require abstracting and/or be abstracted of data based on location preferences 204 and privacy settings 210.

Further, data privacy restrictions 212 may be associated with privacy data models 220, which may correspond to data abstractions 222 that may allow a user to abstract or hide data identification information of a user while providing a merchant with information for recommendations or actions that may be provided by that merchant to the corresponding user. For example, privacy data models 220 may include rules, data models and/or structures, and/or ML models that may be used to generate abstracted data and corresponding structured data (e.g., in one or more data structures including digital tokens, transferrable data packages, and/or digital representations) based on one or more of privacy settings 210 for a detected location corresponding to one or more of location preferences 204. Privacy data models 220 may be used to determine data of likely use or need by the user at a location (e.g., based on interests, past purchases, etc.), as well as what data may be shared for the user based on privacy settings 210 limiting data sharing at the location.

For example, a current location 224 may be detected by mobile device 110, where current location 224 is used with location preferences 204 and privacy settings 210 to determine a privacy setting 226. Thereafter, privacy setting 226 may be used with user data 214 and/or privacy data models 220 to determine abstracted data that may be transmitted to and/or shared with one or more devices at a location. Such sharing may enable and/or be used to execute actions by the location-specific or associated devices, which may include providing back notifications, information, and/or services. Since the data is abstracted for the user, the abstracted data may limit or prevent data tracking and/or identification of the user, and may further be used to request deletion or removal of the data after use by the devices.

FIG. 3 is exemplary data table 300 of abstracted user data from one or more data models that may be provided to one or more devices associated with a location of a user, according to an embodiment. Data table 300 may be generated based on one or more privacy settings established by user interface 200 of FIG. 2. In this regard, data table 300 may be generated by mobile device 110 discussed in reference to system 100 of FIG. 1 based on detection of a location of a user or to which a user is visiting, as well as a privacy setting of the user with the location.

A user may be approaching or at a location, such as via geo-location coordinates, a direction of travel, a geo-fenced area, or the like, which may correspond to a merchant location (e.g., a physical store that may sell items). The user may have a specific purpose for visiting the location, such as to purchase an item, but may want to hide or abstract their data to protect data privacy. The item may be designated by the user for purchase or interest, or may be determined based on a search history, past purchase, an interest or preference of the user, or the like. Based on this information, assistance, information, and/or services may be provided to the user. For example, one or more devices associated with the location, such as merchant and/or location-specific devices, may utilize this user information to provide the user with an interactive map that displays item information and/or location in the map. This allows a user to quickly access and/or obtain the item. The user may also be provided with item comparisons and similar items, including price comparisons. However, the user may instead be browsing and not specifically targeting an item or activity of interest. Thus, more general item information, specialties or sales, rewards, and/or activities may be of interest to the user. This information provided to the user may also be based on past and/or current information for the user, such past purchases and times of purchases, user information, browsing histories, and the like.

In order to protect data privacy and/or enforce data privacy settings, abstracted user data 302 in data table 300 may be generated and/or modeled based on user data, privacy settings, and one or more data models and/or modeling operations. Abstracted user data 302 may be based on transaction data for a user and may be utilized to determine item and/or purchase interests of a user. Abstracted user data 302 may be scrubbed of user identifying information and/or may have certain user data removed, such as transaction instrument identification, purchase price, purchase location and/or merchant identification, and the like. As such, abstracted user data 302 includes scrubbed or abstracted data records from user data records and/or tables, which removes certain user and/or identification data. Abstracted user data 302 may include columns for transaction identifiers 304 and dates 306 that are allowable to be shared from a set of data records. In order to abstract and/or hide additional user data, identification, and/or user identifiers, abstracted user data 302 further includes user abstraction data 308 having a hidden identifier (ID) 310. User abstraction data 308 may correspond to a data abstraction that does not specifically identify a user, however, allows for communication with the user and/or execution of actions with the user including providing recommendations, advertisements, other notifications, and/or services specific to the user. As such, hidden ID 310 may be used to execute those actions with mobile device 110 in response to mobile device 110 providing abstracted user data 302.

In abstracted user data 302, data records that may be used to execute these actions and/or provide these messages and/or services are shown. The data records are shown for transaction identifiers 304 and dates 306. For example, a first UPC 312 is shown on a first date 314 of January 4 and a second UPC 316 is shown on a second date 318 of January 6. These dates may correspond to past purchases of the user, where UPCS 312 and 316 may correspond to an item purchased by the user on those dates. The abstracted transaction data records may also include a transaction ID 320 on a third date 322 of January 5, which may correspond to another transaction that may not have a UPC for an item purchase, such as a dinner purchase at a restaurant, or where a UPC for an item is hidden. Lastly, the abstracted transaction data records include transfer ID 324 on a fourth date 326 of January 4, which may correspond to a transfer that may indicate an interest or a past activity of the user.

Based on the abstracted transaction data records in abstracted user data 302, the aforementioned messages and services may be provided to a corresponding user while maintaining a data privacy of the user based on a privacy setting for the location. In order to obtain those messages and/or services, as well as allow location-specific or associated devices (e.g., merchant devices) to execute further actions with the user and/or the user's mobile device, abstracted user data 302 may be transmitted to one or more devices associated with the location of the user and/or to be visited by the user. Mobile device 110 may utilize abstracted user data 302 to create or generate a corresponding digital token that represents abstracted user data 302 and may be transmitted to one or more devices associated with the location, such as over network communications, wireless communications (e.g., WiFi, Bluetooth, etc.), and/or short-range wireless communications (e.g., NFC, RFID, etc.). However, other data structures may also be generated and/or utilized. For example, a data package that may be transmissible through via wired or wireless connections may also be generated, as well as digital representations that are transmissible or output via output devices of mobile device 110 and capturable by the devices associated with the location. Such digital representations may include a QR code, a barcode, audio communications, animated QR or barcodes, or other displayable or communicable representations of abstracted user data 302.

Thereafter, the digital token, digital data package and/or digital communications, or digital representation may be transmitted to one or more devices associated with the location for those devices to execute actions that provide messages, information, and/or services to mobile device 110. In such embodiments, the provided data may be used to provide an interactive map showing items, sub-locations, and/or objects of interest, routes through the location and/or to sub-locations, activities of interest or required by the user at the location, and the like. Item comparisons and/or discounts and rewards may be provided for different items of interest to the user. Additionally, further monitored activities and data of the user at the location may be used to change, update, and/or execute further actions with the user's device at the location.

FIG. 4A is a flowchart 400a for determining actions that may be taken by a merchant with a user at a merchant location based on corresponding abstracted data, according to an embodiment. Note that one or more steps, processes, and methods described herein of flowchart 400a may be omitted, performed in a different sequence, or combined as desired or appropriate.

At step 402 of flowchart 400a, it is detected that a user is at or approaching a merchant location. The detection may be based on a geo-location of the mobile device, as well as entering a geofenced area or other target range of the merchant location. This detection may also be based on a travel speed and/or direction of the mobile device. At step 404, a privacy setting associated with the merchant location is determined based on a user profile associated with the user. The user profile may correspond to a privacy setting profile that may be established by the user with their corresponding mobile device. The user profile may therefore include one or more privacy settings, which may be associated with merchants and/or locations for generating private and/or abstracted data that does not identify the user while still providing relevant data to the merchant for the merchant to provide recommendations, services, and/or other actions to the user. Further, the privacy profile may be retained on device to allow for on-device and client-side data privacy settings and determinations.

At step 406, an action or recommendation corresponding to a merchant at the merchant location is determined using one or more data models. The action may correspond to a recommendation, a merchant service, or other performable or executable action to be taken with and/or provided to the user at the merchant location by the merchant. For example, a ML model or other AI model or engine may be used to predict, based on user behaviors, past activities, interests, or the like, a potential reason for the user to visit the merchant location and/or an activity the user may engage in at the merchant location. This, in turn, may be used to determine an action for the merchant to perform with the user in order to provide recommendations, merchant services, and the like that are relevant to the user. The data models may be trained and/or generated based on past user behaviors and/or similar user models and activities, which may be used to predict these recommendations and/or actions for the merchant to take with the user.

At step 408, a data structure for abstracted data of the user is generated based on the privacy setting and the action. The abstracted data may correspond to data that provides the action for the merchant to perform with the user at the location, but further does not include and/or hides identification information for the user. For example, the abstracted data may not include a username, identifier, or other information that may be used to identify and/or track the user. The data structure may correspond to a digital token that may be transmitted either by network and/or short-range wireless communications. In some embodiments, the data structure may correspond to a data package having data tables for the abstracted data. The data structure may also correspond to a presentable code or digital image that may convey the data when scanned or imaged by a device at or nearby the merchant location.

At step 410, the data structure for the abstracted data is transmitted to a merchant device associated with the location. The data structure may be output by the mobile device and transmitted to or otherwise received by the merchant device. The data structure may abstract and/or hide identification information of the user so that the action predicted for the merchant to take with the user may be conveyed to the merchant while maintaining a privacy of the user. At step 412, information corresponding to the determined recommendation or action is received from the merchant device based on the abstracted data. The recommendation may include providing a recommendation relevant to the user or otherwise performing an action by the merchant with the user and/or the user's mobile device. For example, the recommendation may include messages, notifications, offers, interactive or displayable maps or directions, comparisons, discounts, and the like.

FIG. 4B is a flowchart 400*b* for on-device data privacy operations to prevent data sharing at user locations, according to an embodiment. Note that one or more steps, processes, and methods described herein of flowchart 400*b* may be omitted, performed in a different sequence, or combined as desired or appropriate.

At step 422 of flowchart 400*b*, it is detected that a mobile device of a user is within a threshold distance of a merchant location. For example, a user may be detected as being located at or associated with a location based on a geo-location of the mobile device, a check-in by the mobile device, a mapping application and/or route input by to the mobile device, or a schedule available via the mobile device. In one or more embodiments, the user may be identified as approaching the location based on a geo-location and/or a current movement, such as distance to the location, speed and/or direction of the user, vehicle that the user is utilizing, schedule of the user, and/or other parameters for the user. In some embodiments, the user may be detected as approaching a location by detecting the user as entering a geo-fenced area for the location, such as a parking lot or structure, area wider than the specific location (e.g., a campus), or the like. However, the user may also be detected at or within a location by detecting a geo-location of the user and matching or correlating that geo-location to the location.

In additional embodiments, the user may be detected as at or approaching a location based on user activities of the user, and additional user activities of the user may be monitored to determine potential activities of the user at the location. For example, the user activities may include user biometrics and/or other user movements and body activities at or approaching the location (e.g., gait, sub-locations visited, etc.). Activities with a computing device may also be detected in order to determine the user is at or approaching a location. The activity may also be actions or interactions that the user is engaged in while at or approaching the location. Thus, the user activity may be with the user and an object, person, or other thing at the location, may be with the user and their corresponding device, and/or may be an upcoming or predicted activity for performance by the user at the location. These activities may be monitored to determine a predicted reason or the like for visiting the location, which may affect data of the user provided to one or more devices based on privacy settings of the user. For example, the user-specific data that is abstracted for the device(s) associated with the location may correspond to data that is particularly relevant or useful for the user at the current location to execute one or more actions with the user and/or user's mobile device.

At step 424, a user profile associated with the user is determined. The user profile may include location-specific data privacy settings that limit, abstract, or hide user and/or identification data, including user-specific and/or device-specific data, from being provided to devices associated with the location. The data provided to one or more devices associated with the location may be selected, restricted, and/or limited based on data privacy settings, laws, regulations, and/or preferences. For example, the user may specify certain data to share and other types, categories, or specific designations of data to hide or obscure at certain locations. The user may opt-in or assign their own data privacy settings. Thus, the user profile may include user established privacy settings. The privacy settings may also be established and/or configured based on data privacy laws. Data privacy laws and/or regulations may be location-specific and therefore apply based on a location of the user (e.g., state, country, or another region associated with the user). An entity, such as a merchant, may also have data privacy rules or preferences for data sharing. Thus, certain user and/or identification data may be prevented or limited from being shared or may be required to be scrubbed or abstracted.

The user profile may further correspond to both settings by a user (e.g., user interests, preferences, etc.) and past data detected or accrued for the user (e.g., past purchases, search histories, messages and/or communication exchanges, etc.). Such data may correspond to user and/or identification data, which may be stored in a data table having data records that may be altered and/or scrubbed of certain data for data privacy settings. At step 426, it is determined that the user has a privacy setting associated with the merchant location based on the user profile. Thus, the user profile, the privacy settings, and the location may be analyzed to identify and/or determine a privacy profile or privacy settings for the user at the location. This may include one or more data privacy requirements that limit, abstract, and/or adjust data and types of data from sharing and/or transmission to devices associated with the location.

At step 428, a client-side determination of data associated with the user for the merchant location is determined based on one or more data models and the privacy setting. The data model(s) may correspond to one or more models using rules, ML models, and the like for determining recommendations and/or actions that may be provided to the user by a merchant at the merchant location, such as based on interests and/or predicted activities of the merchant at the merchant location. These predictions and/or recommendations by the data models may then be used for abstracting data based on the privacy setting for the location and any specific or desirable data to share with devices associated with the location. In this regard, the data model may designate a data structure having data records or other processable data that have been scrubbed, cleaned, or abstracted of certain data for privacy, while retaining other data that is to be shared while hiding an identity or other information of a user.

At step 430, abstracted data for the merchant location is generated using the client-side determination. The abstracted data may correspond to one or more data records or other pieces of data that may be abstracted of certain data designated by privacy settings and/or have the certain data hidden from being revealed. In this regard, certain data that may be useful for the user and/or merchant at the merchant location may be shown in the abstracted data, while other identifying data and/or specified data may be hidden or abstracted to prevent user identification or tracking. For example, the abstracted data may be used to provide the recommendation and/or action that the merchant may take, execute, or provide to the user at the merchant location, while preventing or obscuring identification of the user and/or sharing specific identification or privacy data. The abstracted data may therefore hide user information, identifiers, and the like, as well as other private, confidential, and/or sensitive data as designated by the privacy setting.

At step 432, a digital token for the abstracted data is created. The digital token may be created for transmission to one or more devices. In other embodiments, other digital data packages and/or digital representations of the abstracted data may be created. For example, network communications and data packages may be used for wireless communications. QR or barcodes may also be generated, as well as other outputs from an output component of a mobile device. At step 434, the digital token is transmitted to a computing device associated with the merchant location. The transmission may occur before or when the user device is detected at the merchant location. In response to transmitting the digital token, one or more actions may be executed by the receiving device. For example, the receiving device may determine and/or provides messages, notifications, offers, interactive or displayable maps or directions, comparisons, discounts, and the like that may be based on the received data. The actions may also include providing services to the user and/or their mobile device, such as by providing computing services including electronic transaction processing and/or in-application data, as well as directing service assistance to the user.

Figure 5:
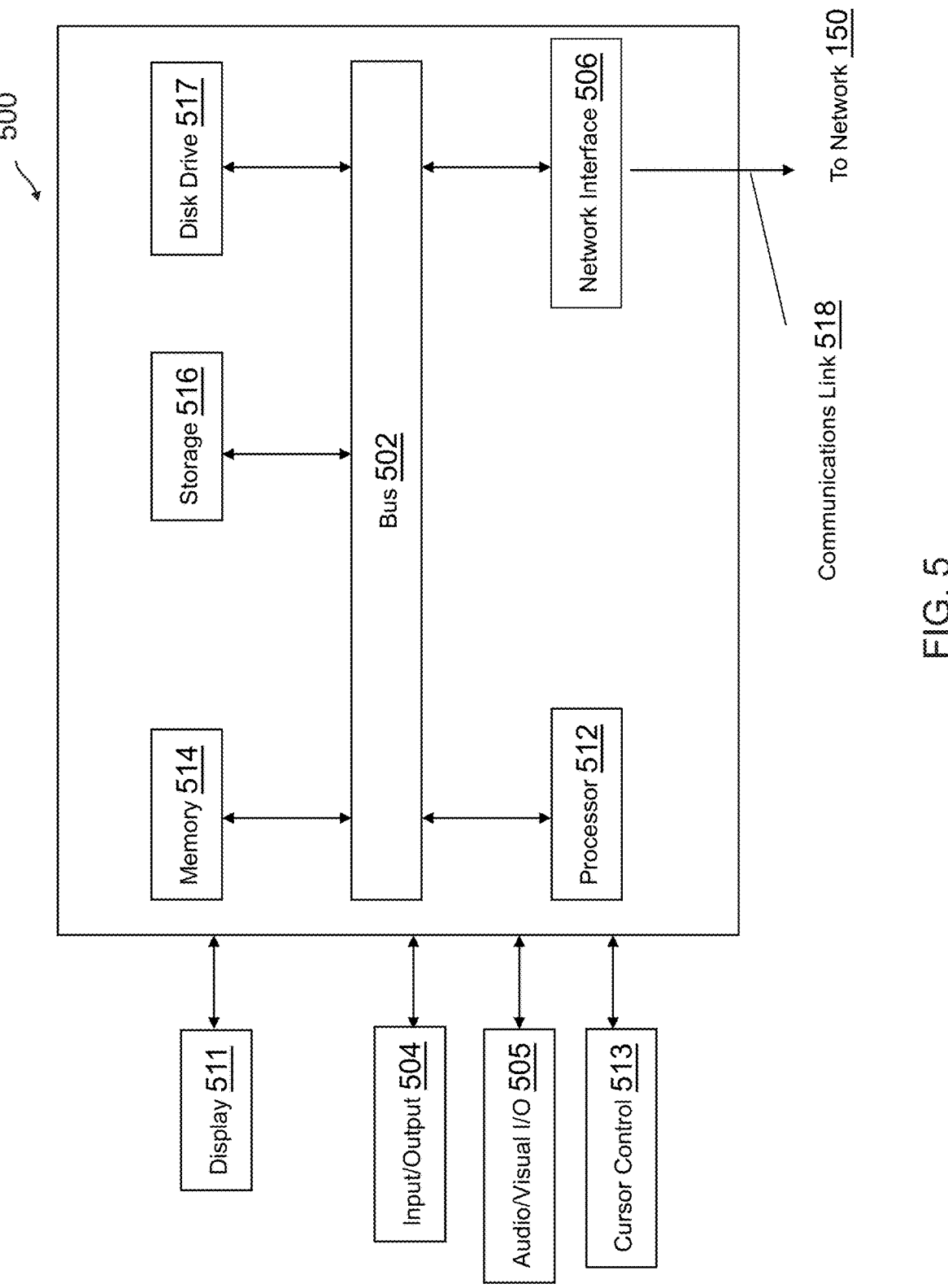
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. For example, while the description focuses on gift cards, other types of funding sources that can be used to fund a transaction and provide additional value for their purchase are also within the scope of various embodiments of the invention. Thus, the present disclosure is limited only by the claims.

What is claimed is:

1. A mobile device system, comprising:

a non-transitory memory; and one or more hardware processors coupled to the non-transitory memory and configured to read instructions from the non-transitory memory to cause the mobile device system to perform operations comprising:

detecting that the mobile device system is within a threshold distance to a merchant location;

determining that the mobile device system, associated with a user, has a first privacy setting enabled to prevent at least a portion of user information from being provided to a merchant corresponding to the merchant location;

abstracting information from the user information based on the first privacy setting and the merchant location;

generating a digital data package for the abstracted information for providing to a merchant device at the merchant location; and transmitting the digital data package to the merchant device in response to a request for user data as part of a transaction at the merchant location.

2. The mobile device system of claim 1, wherein the operations further comprise:

receiving the request for user data from the merchant device at the merchant location.

3. The mobile device system of claim 2, wherein the request for user data is received in association with the transaction at the merchant location.

4. The mobile device system of claim 1, wherein the operations further comprise:

utilizing one or more models to determine, based on the user information, one or more recommendations for the user and associated with the merchant location.

5. The mobile device system of claim 4, wherein the information is abstracted from the user information based at least in part on the one or more recommendations.

6. The mobile device system of claim 1, wherein abstracting the information includes removing at least one identifier from the user information.

7. A method, comprising:

receiving, by a mobile device associated with a user, a request to share user data with a location-specific device associated with a merchant location;

determining a first privacy setting enabled on the mobile device, the first privacy setting enabled to prevent at least a portion of user information from being provided to a merchant corresponding to the merchant location;

determining abstracted data from the user information based on the first privacy setting; and in response to the request, providing the abstracted data to the location-specific device as part of a transaction at the merchant location.

8. The method of claim 7, wherein the request to share user data is received as part of the transaction by the user at the merchant location.

9. The method of claim 8, wherein determining the abstracted data limits the user data based on the first privacy setting and the transaction.

10. The method of claim 7, wherein determining the abstracted data removes at least one identifier from the user information.

11. The method of claim 8, further comprising:

generating a data removal request for the abstracted data after processing the transaction.

12. A non-transitory machine-readable medium having instructions stored thereon that are executed by a computer system to perform operations comprising:

receiving, by a mobile device associated with a user, a request for user data, the request associated with a merchant location;

determining a privacy setting for the merchant location, the privacy setting being associated with at least a portion of user data;

determining a predicted activity by the user at the merchant location;

generating, based on the privacy setting and the predicted activity, abstracted data from the user data; and providing, to a merchant device at the merchant location, a digital representation of the abstracted data in response to the request for user data and as part of a transaction at the merchant location.

13. The non-transitory machine-readable medium of claim 12, wherein the request for user data is received as part of the transaction by the user at the merchant location.

14. The non-transitory machine-readable medium of claim 13, wherein generating the abstracted data limits the user data based on the privacy setting and the transaction.

15. The non-transitory machine-readable medium of claim 12, wherein generating the abstracted data removes at least one identifier from the user data.

16. The non-transitory machine-readable medium of claim 13, wherein the operations further comprise:

generating a data removal request for the abstracted data after processing the transaction.

17. The non-transitory machine-readable medium of claim 12, wherein the operations further comprise:

in response to providing the digital representation, receiving a recommendation associated with the merchant location; and providing a data removal request for digital representation in response to the recommendation.

* * * * *